(12) United States Patent
Masuda et al.

(10) Patent No.: US 6,591,148 B1
(45) Date of Patent: Jul. 8, 2003

(54) NUMERICAL CONTROL DEVICE

(75) Inventors: Teruo Masuda, Yamanashi (JP); Eiji Genma, Yamanashi (JP); Ken Yasuda, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 279 days.

(21) Appl. No.: 09/584,475

(22) Filed: Jun. 1, 2000

(30) Foreign Application Priority Data

Jun. 2, 1999 (JP) .......................................... 11/154817

(51) Int. Cl.$^7$ ............................................... G06F 19/00
(52) U.S. Cl. ........................... 700/61; 700/71; 700/176; 700/177; 700/178; 700/193; 700/190; 451/3; 451/9; 451/11; 409/274
(58) Field of Search .......................... 451/3, 8–11, 242, 451/246; 409/132, 274; 700/86, 195, 161, 159, 160, 61, 62, 63, 69, 70, 71, 72, 79, 80, 177, 175, 176, 178, 169, 188–193

(56) References Cited

U.S. PATENT DOCUMENTS

| | | | |
|---|---|---|---|
| 4,723,219 A | * | 2/1988 | Beyer et al. ................. 318/572 |
| 4,839,817 A | | 6/1989 | Fujimoto |
| 4,980,627 A | | 12/1990 | Joboji et al. |
| 5,060,544 A | | 10/1991 | Hanaki et al. |
| 5,414,633 A | | 5/1995 | Chang |
| 5,562,523 A | * | 10/1996 | Asano et al. .................. 451/1 |
| 5,825,655 A | | 10/1998 | Nakagawa et al. |
| 6,113,461 A | * | 9/2000 | Onoda et al. .................. 451/5 |

* cited by examiner

Primary Examiner—Ramesh Patel
(74) Attorney, Agent, or Firm—Staas & Halsey LLP

(57) ABSTRACT

A numerical control device for synchronously controlling the movement of a plurality of axes of a machine by repeatedly controlling a cyclic motion. An axis of the machine is designed to stop at a predetermined position upon the occurrence of an emergency stop. To achieve this stop position, an amount of retraction is set up to a position where a tool of machine does not interfere with a work piece or other obstacles. When an emergency stop signal is entered during a binary operation, because of an occurrence of an abnormality, a movement control amount for each period, corresponding to a set amount of retraction, is added to the movement control amount for each period of the binary operation and the axis is thereby driven by the resultant modified movement control amount. The binary operation is stopped upon the reaching of the stop position, and the tool can be held at this retracted position, by the set amount of retraction. Thus, the tool can be retraced to a predetermined position where it does not interfere with either a work piece or another obstacle.

8 Claims, 4 Drawing Sheets

NUMERICAL CONTROL DEVICE

BACKGROUND OF THE INVENTION

1. Field of the Invention

The present invention relates a numerical control device and, in particular, a numerical control device performing a high speed binary operation and a high speed cyclic machining.

2. Description of the Prior Art

In a numerical control device, a movement command is interpolated or distributed to each axis movement command for each predetermined period based on an NC program describing the movement command by a straight line, a circular arc line or the like to thereby move each axis. However, in the case of a high speed machining or the like, as a program analysis and an interpolation processing do not meet a machining speed, a numerical control device provided with the functions of a high speed binary operation and a high speed cyclic operation (hereinafter collectively referred to as a binary operation) is employed, wherein the movement of each axis for each predetermined distribution period is stored and the stored movement for each distribution period is read out and outputted to each axis every distribution period, so that each axis is driven and controlled to machine a work.

In this binary operation, it is possible to synchronize the complex motions of a plurality of axes with each other at high speeds because any distribution movement can be commanded to each of the plurality of axes.

Also, in the case where a machine is suddenly caused to be stopped when an abnormality occurs, a numerical control device which performs a retracting motion for retracting a tool from a work to be machined is publicly known in a usual NC machining program.

In the above mentioned binary operation function, an acceleration/deceleration control is also performed based on the movement for each distribution period stored in a memory unit and, therefore, if a machining is normally finished, there is no problem. However, in the case where a machine needs to be suddenly stopped because of occurrence of abnormalities or the like, unlike the normal machining, there is no accumulation for acceleration or deceleration and, therefore, the reset of the binary operation suddenly will stop the supply of the distribution movement and produces an over error or an excess current to give a servo alarm. That is, if the supply of the distribution movement is stopped while a movable part of the machine is moving at high speeds, the movable part of the machine is going to stop but can not stop immediately because of inertia and the like. For this reason, the movement is fed back to increase errors in positioning and the increased errors will produce an excess current and give a servo alarm. If the servo alarm is given, a motion of retracting the tool can not be performed. Further, since the state of synchronization can not be kept, the tool machining the work is held engaged with the work, which sometimes results in breaking the tool and the work.

In a high speed cyclic machining, a function referred to as a retraction in the high speed cyclic machining is publicly known and used. This retraction motion is to retract a tool axis machining a work to a safe position by adding a retracting movement to a distribution movement when an abnormality occurs. However, since the retracting movement is an incremental amount, a position (retraction position) where the retracting motion is finished is different depending on a position where the retracting motion (or retreat) is started. Therefore, this function of retraction has a drawback that the tool axis can not be retracted to a determined position of an absolute coordinate system.

In order to retract the tool axis machining the work to the determined position of the absolute coordinate system during the binary operation, the following method can be thought: first, a movement is calculated from the distance between the position of the tool when an external signal or an alarm occurs and the absolute position where the tool is to be retracted, and then, the supply of distribution movement of the binary operation is stopped and the tool axis is retracted by the calculated movement, whereby the tool axis can be retracted to the determined position of the absolute coordinate system during the binary operation. However, in this case, the supply of the distribution movement of the binary operation is stopped and hence the synchronous motion between axes in the binary operation which has been kept can not be kept any more, which produces a possibility in some machines that the axes come into collision with each other.

OBJECTS AND SUMMARY OF THE INVENTION

It is the object of the present invention to provide a numerical control device enabling a retracting motion in a binary operation and capable of retracting the retracting axis of a tool or the like to a set position in an absolute coordinate system.

In order to accomplish the above object, in the first embodiment of the present invention, a numerical control device controls movement of each axis of a machine synchronously with each other to repeatedly control a cyclic motion by storing a movement of each axis of the machine for each predetermined period in a memory unit and by supplying the movement stored in the memory unit to each axis every predetermined period from a numerical control section. The numerical control device includes a retracting unit which gives an amount of retraction to a specified axis as a retracting axis, from among the axes synchronously controlled so that the retraction is added to a synchronous control of the retracting axis and stops the supply of the movement stored in the memory unit, in the event of an emergency stop due to the occurrence of an external signal or an alarm. The retracting unit stops the supply of the movement at the predetermined point of the cyclic motion.

Preferably, the amount of retraction is previously set in the retracting unit.

In the second embodiment of the present invention, a numerical control device controls movement of each axis of a machine synchronously with each other to repeatedly control a cyclic motion by storing a movement of each axis of the machine for each predetermined period in a memory unit and by supplying the movement stored in the memory unit to each axis every predetermined period from a numerical control section. And the numerical control device comprises a retracting unit which determines a motion region of a cyclic motion at the time of occurrence of an external signal or an alarm, moves a axis which is specified as a retracting axis from among the axes synchronously controlled in a specified direction by the set amount of retraction and stops the supply of the movement stored in the memory unit, in the event of an emergency stop due to occurrence of an external signal or an alarm. The retracting unit stops the supply of the movement at a predetermined point of the cyclic motion corresponding to the determined motion region.

Preferably, the retracting unit is set for each motion region.

Preferably, the retracting unit adds the amount of retraction to the movement for the cyclic motion of the retracting axis extending over a predetermined number of periods, in the event of an emergency stop due to occurrence of an external signal or an alarm.

Preferably, the point where the retracting unit stops the supply of the movement is determined based on the rotational position of another axesynchronously controlled together with the retracting axis.

According to the present invention, in the event of an emergency stop due to occurrence of an abnormality during a binary operation performing a cyclic motion, a retracting axis can be retracted to a predetermined position in an absolute coordinate system and hence the retracting axis can be retracted to a set position where a tool or the like mounted on the retracting axis does not interfere with a work and any obstacles.

BRIEF DESCRIPTION OF THE DRAWINGS

The foregoing and other objects and features of the present invention will become apparent from the following description of preferred embodiments of the invention with reference to the accompanying drawings, in which.

DETAILED DESCRIPTION OF THE PREFERRED EMBODIMENTS

Figure 1:
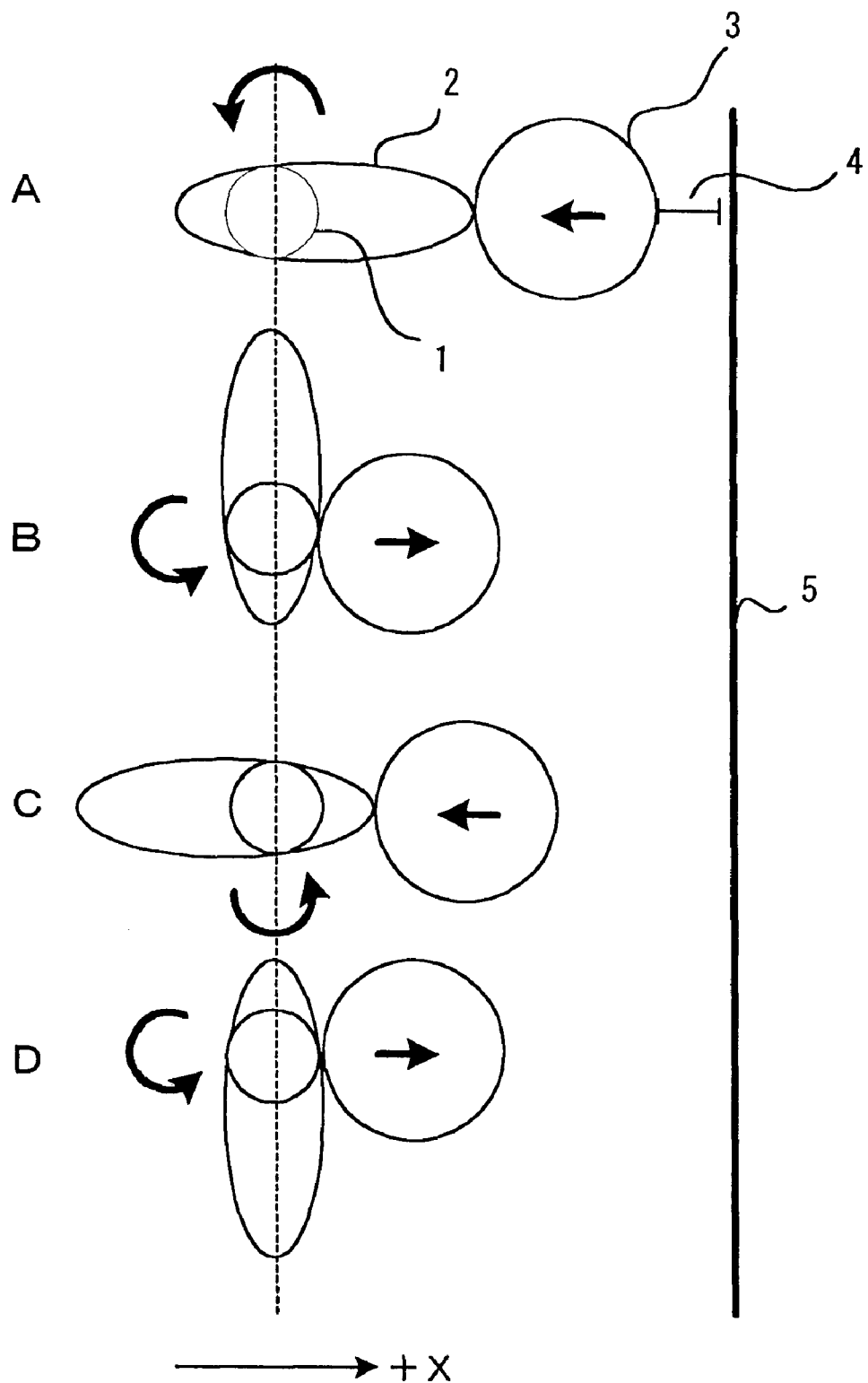
FIG. 1 is a conceptional view of a retracting motion during the binary operation in accordance with the present invention.

FIG. 1 is a conceptional view of a retracting motion performed by a machine controlled by a numerical control device in accordance with the present invention. This figure shows an example in which a machine grinds an ellipsoidal cam by synchronizing the reciprocating motion of an X axis mounted with a tool (grinding wheel) 3 with the rotating motion of a rotary axis (C-axis) 1 mounted with a workpiece 2 by a binary operation. The movement of the rotary axis 1 rotating the workpiece 2 and the movement of the X axis for reciprocating the tool 3 are stored as the movements for each predetermined period in a memory unit and the movements are read out from the memory unit every predetermined period and are outputted to the driving units of the rotary axis 1 and the X axis to synchronize the rotary axis 1 with the X axis to grind the cam.

In FIG. 1, reference characters A, B, C, and D designate positions where the direction of motion of the X axis is changed from a plus direction to a minus direction of from the minus direction to the plus direction. The rotary axis (C-axis) 1 rotates counterclockwise and, at position A, the direction of motion of the X axis is changed from the plus direction to the minus direction. The X axis moves in the minus direction from point A in synchronization with the rotary axis 1 rotating counterclockwise and grinds the longer side of the ellipsoidal work (cam) 2. When the X axis arrives at position B, the moving speed of the X axis becomes zero and then the X axis starts to move in the plus direction of the X-axis.

The rotary axis 1 rotates counterclockwise and the X axis moves in plus direction in synchronization with the rotary axis 1 to grind the cam and, when the X axis reaches position C, the moving speed of the X axis becomes zero and then the direction of motion of the X axis is changed to minus direction. Further, when the X axis reaches position D, the moving speed of the X axis becomes zero and the direction of motion of the X axis is changed to plus direction. Still further, when the X axis moves in synchronization with the rotary axis and reaches position A, the moving speed of the X axis becomes zero and the moving direction of the X axis is changed to minus direction, as described above. Then, the tool cuts in minus direction of the X-axis by a predetermined amount of depth and the above explained motion from position A to position D is repeated to grind the workpiece 2 into the ellipsoidal cam.

In such a binary operation, when an abnormality occurs, a retracting axis is the X axis and a retracting direction is plus direction of the X-axis where the X axis goes away from the workpiece 2. In the prior art, when an abnormality occurs, the X axis is caused to be retracted by a predetermined amount of retraction, or caused to be moved in plus direction of the X-axis by a set amount of retraction. If the set amount of retraction 4 is small, as shown in FIG. 1, when an abnormality occurs at position B, C, or D, the amount of retraction 4 is not sufficient and hence the tool 3 may come into collision with the workpiece 2.

To avoid this collision between the tool 3 and the workpiece 2, it is recommended that the amount of retraction 4 be set so as to prevent the tool 3 from coming into collision with the workpiece 2 at all positions for a grinding cycle. However, as shown in FIG. 1, in the case where an obstacle 5 such as the other part of the machine or a peripheral unit is arranged in the direction of retraction of the X axis, the tool 3 mounted on the retracting axis comes into collision with the obstacle 5 when the retracting axis is retracted. For example, in FIG. 1, if the amount of retraction 4 up to the obstacle 5 is set on the basis of position C or position D, when an abnormality occurs near position A and a retracting motion starts, the X axis may come into collision with the obstacle 5 because the amount of retraction 4 is large.

For this reason, the present invention performs a retracting motion which does not produce an interference such as a collision of the tool 3 mounted on the retracting axis with the other part and with the workpiece 2 during the retracting motion. In the first preferred embodiment in accordance with the present invention, as shown in FIG. 1, the position to which the tool mounted on the retracting axis (X axis) is retracted during a retracting motion is set at a set position in an absolute coordinate system where the tool does not come into collision with the obstacle 5 and the workpiece 2.

Figure 2:
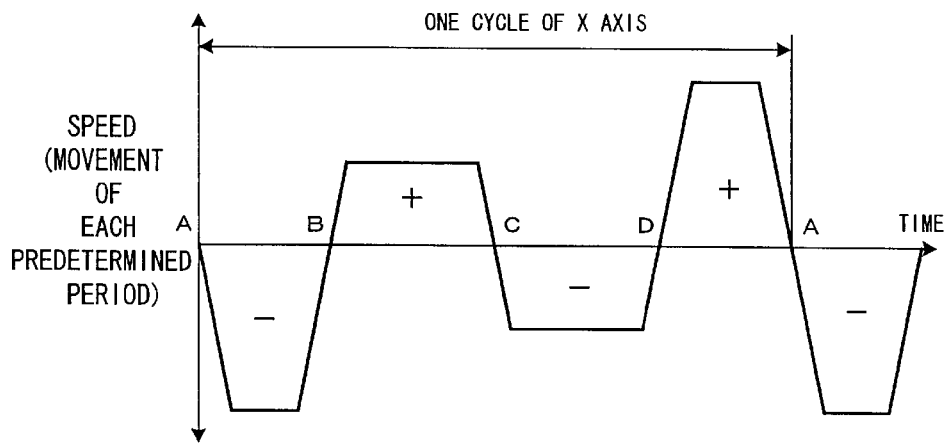
FIG. 2 is an illustration of one motion cycle of the binary operation shown in FIG. 1.

FIG. 2 is a graph showing one cycle of the motion of the X axis in a grinding motion shown in FIG. 1. A vertical axis shows a speed, that is, the movement of each predetermined period stored in a memory unit, and a horizontal axis shows a time. Positions A, B, C, and D in FIG. 1 correspond to position A, B, C, and D of the time axis shown in FIG. 2. The X axis moves in a minus direction between positions A and B, in a plus direction between positions B and C, in the minus direction between positions C and D, and in the plus direction between positions D and A, and a speed pattern between the positions is shown in FIG. 1. The motion from A to D is one cycle of the motion of the X axis and the X axis repeats this cycle while cutting the workpiece in the minus direction of the X-axis by a set depth of cut.

Figure 3:
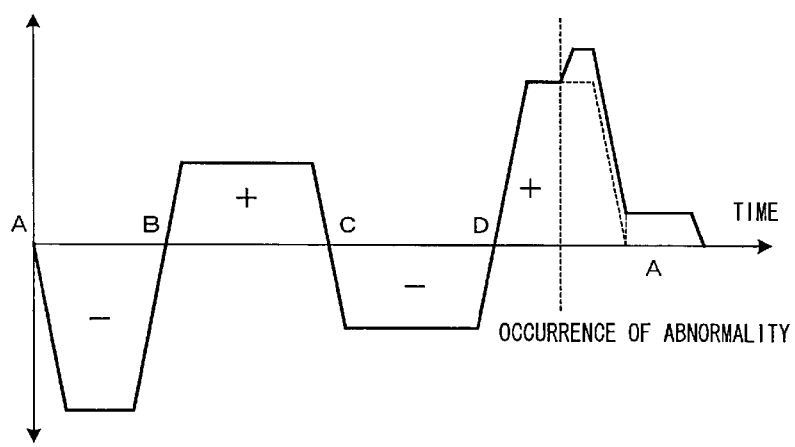
FIG. 3 is an illustration of the retracting motion in the present invention during a binary operation.

FIG. 3 shows a motion including the retracting motion of the X axis when an abnormality occurs or an emergency stop command is inputted as an external signal between positions D and A during such a grinding motion.

When the emergency stop command is inputted because of occurrence of an abnormality, the set amount of retraction is added to the movement of the X axis which is a retracting axis for each predetermined period and the resultant movement is outputted to drive the X axis. In the first preferred embodiment, as shown in FIG. 1, the binary operation is stopped at position A where the tool is at the farthest position from the rotary axis of the workpiece, and the distance between the position A and a position just before the position where the tool collides with the obstacle 5 is set as the amount of retraction 4 and a retracting speed is also set in advance.

As shown in FIG. 3, when an abnormality occurs between positions D and A, a movement for each period identical to the period in the binary operation is determined by the amount of retraction and the retracting speed which are set at the position when the abnormality occurs, and the determined movement is added to the movement for each predetermined period in the binary operation of the X axis and is outputted to the axis control circuit of a servomotor for controlling the X axis. As a result, as shown in FIG. 3, the speed of the X axis becomes the sum of the normal speed of the binary operation and the speed of the retracting motion (the speed in the direction in which the tool 3 goes away from the workpiece 2), whereby the tool 3 goes away from the workpiece 2. When the output of a movement command by the binary operation reaches position A, the supply of the amount of movement by the binary operation is stopped in the following period. If the movement set by the retracting motion is not completed at this time, as shown in FIG. 3, only the retracting motion is performed, with the result that the tool is moved to and stopped at the position set in the absolute coordinate system, as shown in FIG. 1.

At position A, the direction of the X axis is changed and the speed of the X axis is zero. Accordingly, even if the supply of the movement in the binary operation is stopped at position A, positional error does not become too large and hence a servo alarm due to a large error and an excess current is not issued and a servo system can be normally operated. Therefore, it is possible to keep performing the retracting motion and to move the X axis of the retracting axis to the set absolute position.

Figure 4:
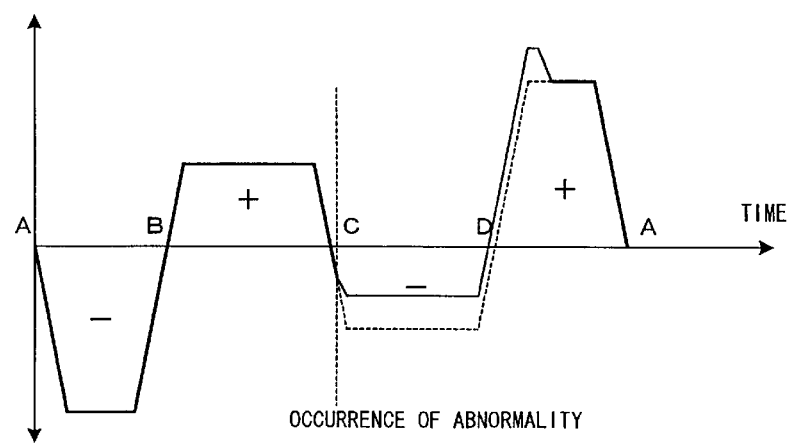
FIG. 4 is an illustration of the retracting motion in the present invention during a binary operation.

FIG. 4 is an illustration describing the motion when an abnormality occurs between positions C and D.

When an emergency stop signal is inputted because of occurrence of an emergency, as described above, the movement for each period for the retracting motion is added to the movement for each predetermined period in the binary operation in accordance with the set amount of retraction 4 and the set retracting speed, and the resultant movement is outputted. As shown in FIG. 4, the speed of the X axis (tool) in minus direction of the X-axis decreases (since the moving direction of the X axis in the binary operation is in minus direction while the direction of retraction is in plus direction, when the amounts of the movements of the two commands are added, the speed in minus direction decreases because the absolute value of the speed in the binary operation is usually larger than the absolute value of the speed in the retracting motion). For this reason, a gap is produced between the tool 3 and the workpiece 2 and is increased as time elapses.

When the addition of the amount of retraction in the retracting motion is finished, only the movement for the binary operation is supplied in the following periods and hence the X axis moves according to a usual moving pattern, as shown in FIG. 4. When the supply of the movement up to position A is finished, the supply of the movement is stopped in the following periods, whereby the X axis is stopped at the set absolute position as shown in FIG. 1.

As described above, when an emergency stop signal is entered because of occurrence of an abnormality or the like, the movement of retraction is added to the movement in the normal binary operation and the resultant movement is supplied to the driving circuit for the retracting axis and the supply of the movement in the binary operation is stopped at the position where the supply of the movement in the binary operation up to position A is completed, which results in moving the X axis which is a retracting axis by the set amount of retraction from position A and stopping it at that position. This retracting position is a position set in the absolute coordinate system irrespective of the position where an emergency signal due to occurrence of an abnormality or the like is entered.

If the tool 3 normally grinds the workpiece 2, a contact point of the tool 3 with the workpiece 2, that is, a grinding point, moves in the direction of the X-axis in a pattern shown in FIG. 2. When the emergency stop signal is entered and the retracting motion starts, the amount of retraction is added to the movement in the normal binary operation in the direction in which the tool 3 goes away from the workpiece 2 and, therefore, the tool 3 is driven up to position A with a gap between the tool 3 and the workpiece 2 (this gap increases until the retracting motion is completed) in synchronization with the workpiece 2 and the binary operation is stopped at position A. For this reason, the tool 3 does not interfere with the workpiece 2. Also, the retracting position of the X axis to be retracted by the retracting motion is previously determined so that it does not interfere with the other.

In the example described above, the movement of the retracting motion for each predetermined period in the binary operation is determined by the amount of retraction and the speed of retraction which are previously set for the retracting motion (further, a acceleration or deceleration control is performed) and is added to the movement in the binary operation. However, in this retracting motion, as is the case with the binary operation, the period of the binary operation and the movement for each predetermined period may be stored extending over two or more periods in a memory unit so that the movement of the predetermined period stored in the memory unit is read out and added to the movement in the binary operation and the resultant movement is outputted.

Figure 5:
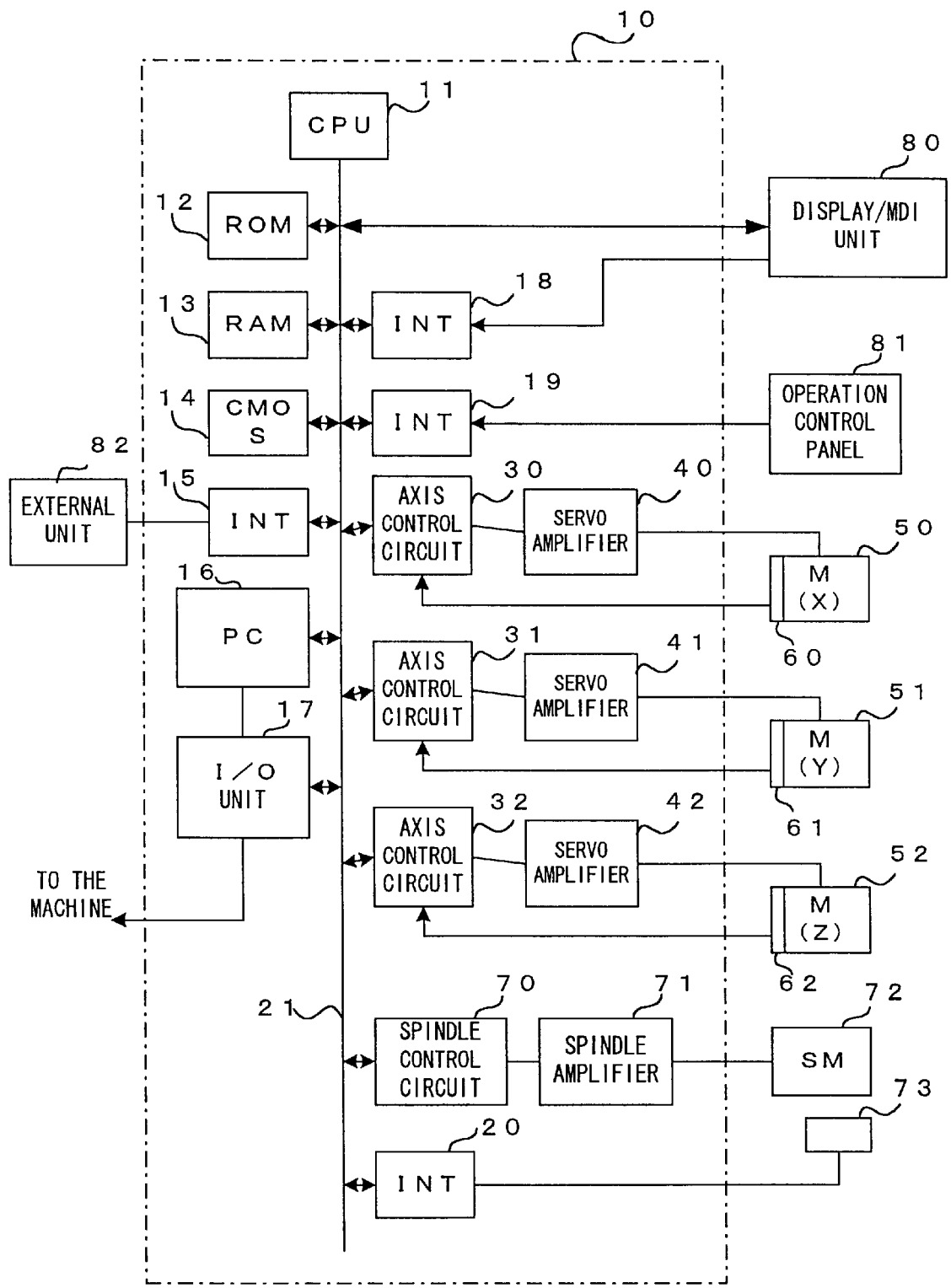
FIG. 5 is a block diagram of the essential portion of the numerical control device of one preferred embodiment in accordance with invention.

FIG. 5 is a block diagram of the essential portion of a numerical control device according to the present preferred embodiment.

A processor 11 is a processor generally controlling a numerical control device 10 and reads out a system program stored in a ROM 12 via a bus 21 and generally controls the numerical control device 10 according to the system program. RAM 13 is temporally stored with a calculation data, a display data, and the like. A CMOS memory 14 is backed up by a battery not shown and is constituted as a non volatile memory which keeps the state of memory, even if the power source of the numerical control device 10 is turned off, and stores a machining program.

An interface 15 is an interface to which an external unit 82 such as a paper tape puncher, a floppy disk driver, or the like is connected. A machining program is read from the external unit 82 and is stored in the CMOS memory 14. Also, a machining program assembled in the numerical control device 10 and stored in the CMOS memory 14 can be outputted to the external unit 82.

A PC (programmable controller) 16 controls a machine tool according to a sequence program stored in the numerical control device 10. More specifically, the sequence program converts a function instructed by the machining program to a signal necessary for the machine tool and outputs it to the machine tool through an I/O unit 17. This output signal operates various kinds of actuators of the machine tool. Also, the PC 16 receives signals of the limit switch of the machine tool and various kinds of switches on the operation control panel of the machine tool and performs necessary processings and passes them to the processor 11.

The present position of axes, alarms, parameters and image signals such as image data are sent to a display unit constituted by a CRT or a liquid display attached to the MDI (manual data input) unit 80 and are displayed on the display screen of the display unit. An interface 18 receives a data from a keyboard attached to the MDI unit 80 and passes it to the processor 11. An interface 19 is connected to an operation control panel 81 and passes a signal entered from the operation control panel 81 to the processor 11.

Each of axis control circuits 30 to 32 receives a movement command for each axis from the processor 11 and outputs the movement command for each axis to each of servo amplifiers 40 to 42. Each of the servo amplifiers 40 to 42 receives the movement command and drives each of servomotors 50 to 52 for each axis. Each of position speed detectors 60 to 62 such as a pulse recorder or the like is mounted on each of the servomotors 50 to 52 for each of X, Y, and Z axes and a feedback signal from the position speed detector is fed back to each of the axis control circuits 30 to 32. Each servo controlling CPU built in each of the axis control circuits 30 to 32 performs a position loop processing, a speed loop processing, and a current loop processing based on these fed-back signals and the above mentioned movement command and determines a current command for a final drive control for each axis to control the position and speed of each of the servomotors 50 to 52 for each axis.

A spindle control circuit 70 receives a spindle rotation command and outputs a spindle speed signal to a spindle amplifier 71. The spindle amplifier 71 receives the spindle speed signal and rotates a spindle motor 72 at a commanded rotational speed. Also, in a C-axis control mode, a position control is performed based on a signal from a position coder 73 fed back via an interface 20.

The constitution of the above mentioned numerical control device is not different from that of a conventional numerical control device. In connection with the present invention, the data for the binary operation is previously stored in the CMOS memory 14. More specifically, movements of individual axes to be synchronized with each other for each predetermined period is stored in the CMOS memory 14 in the case where a high speed repeated operation is performed under synchronization in the same way as in the case of the conventional numerical control device performing the binary operation. The numerical control device according to the present invention is different from the conventional numerical control device in that an emergency stop motion processing program for performing a retracting motion when an abnormality occurs or an emergency stop signal is entered from an external signal is stored in the CMOS memory 14.

Set in the numerical control device 10 in advance are a position where a binary operation is to be stopped when an abnormality occurs or an emergency stop signal is entered from as external signal during the binary operation (in terms of number of periods from the initial period of one cycle of the binary operation; position A in the examples shown in FIG. 1 and FIG. 2), together with a retracting movement and a retracting speed. In this connection, in the case where the movement of the retracting motion is also stored as the movement for the same period as the period of the binary operation as the case of the data of the binary operation, as described above, the movement of each retracting axis for each period is set and stored.

An embodiment of grinding a cam shown in FIG. 1 will be described below. In this embodiment, a workpiece 2 is mounted on a main spindle driven by a spindle motor 72 and a cam is ground under a C-axis control mode for performing a position control on the basis of a feedback signal from a position coder 73.

Figure 6:
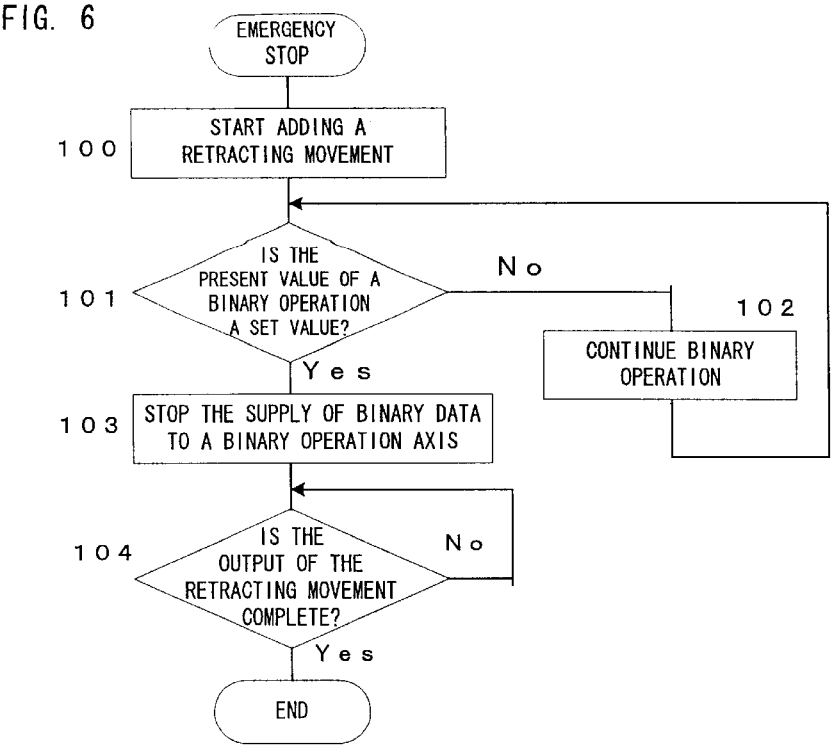
FIG. 6 is a process flow chart of a retracting motion in the preferred embodiment.

FIG. 6 is a flow chart of an emergency stop motion processing performed by a processor 11 when an abnormality occurs during the binary operation or an emergency stop signal is entered from an operation control panel 81 or the like.

When an emergency stop signal is entered, processing of adding a retracting movement is started, more specifically, the processor 11 determines the retracting movement for the period in which the movement in the binary operation is to be outputted from the set amount of retraction and the set speed of the retracting axis (in the case where the retracting movement for each period is stored, the processor 11 reads out the retracting movement for each period and then determines the retracting movement) and adds the determined retracting movement to the movement of retracting axis for each period in the binary operation, thereby outputting the movement for each period to each of axis control circuits 30 to 32. In the example shown in FIG. 1, since the X axis is a retracting axis, the calculated movement for each period for the retracting motion is added to the movement in the binary operation for each period for the X axis and the resultant movement is outputted to the axis control circuit 30 for the X axis. As a result, as shown in FIG. 3 and FIG. 4, the servomotor 50 for the X axis rotates by the movement equal to the sum of the movement of the retracting motion and the movement in the binary operation (step 100).

Next, the processor 11 judges whether the X axis reaches a set stop position or not, that is, judges whether the distribution processing of a movement is performed set number of periods or not (step 101). In the example shown in FIG. 1, the processor 11 judges whether a movement up to position A is outputted or not and the processor 11 may determine by using the number of periods passed from the beginning in one operation cycle. In the example shown in FIG. 1, it is convenient to determine the set stop position (position A) from the rotational position of the rotary axis (C-axis of the workpiece 2).

If the X axis does not reach the set stop position (position A), the processor 11 continues the binary operation (step 102) and a processing of adding the retracting movement for the retracting axis. Then, when the movement in the binary operation up to the set stop position is outputted, that is, when the movement up to position A is outputted in one operation cycle, the supply of a binary data to the binary motion axis is stopped (step 103). Then, the processor 11 judges whether the output of the set retracting movement to the retracting axis is completed or not (step 104) and, as shown in FIG. 3, if the retracting movement remains even when the X axis reaches position A where the supply of the binary data is stopped, the processor 11 continues this retracting motion until completion thereof. This emergency stop processing finishes when this retracting movement is completed. Also, as shown in FIG. 4, when the X axis reaches the stop position in the binary operation (position A), if the retracting movement is already completed, this retracting motion processing is finished at the time when the supply of the movement to the stop position of the binary operation is finished.

In the example described above, supply of the binary operation data is stopped at a point within one cycle of a binary operation, that is supply of the binary operation data is stopped at position A in FIG. 1. The reason why position A is selected as a stop position is that the distance between the tool 3 and the rotary axis 1 driving the workpiece 2 is the largest at position A in a machining cycle and that, because the speed of the X axis is zero at position A, positional error does not become extremely large and do not give a servo alarm, even if the supply of the movement is stopped (in this connection, because the rotary axis 1 rotating the workpiece 2 is controlled by the C-axis control of a main spindle, a servo alarm is not given).

However, the speed of the X axis is zero also at positions B, C, and D and, even if the X axestops at these positions, a servo alarm is not given. If the retracting movement is set in correspondence with positions B, C, and D such that the tool 3 is at the same position in the absolute coordinate system as the retracting position when it stops at position A, the tool 3 can be retracted not to interfere with to the workpiece 2 as well as the obstacle 5.

However, in the case where the supply of the binary data is stopped at positions B and D, there is a possibility that the rotary axis 1 is rotated by inertia or the like to bump against the tool 3 under retraction. To avoid this trouble, it is necessary to increase the speed of the retracting motion. However, in the case where the supply of the binary data is stopped at position C, same as the case of being stopped as position A, even if the work is rotated by inertia, there is little possibility that the work bumps against the tool under retraction because the workpiece is rotated in the direction going away from the tool at an initial stage.

As described above, it is recommended that a point where possibility of generation of a servo alarm is considerably low be found within one cycle of the binary operation, that the point be set as a stop position and that a retracting movement up to the predetermined position in the absolute coordinate system be set in correspondence with the stop position.

Figure 7:
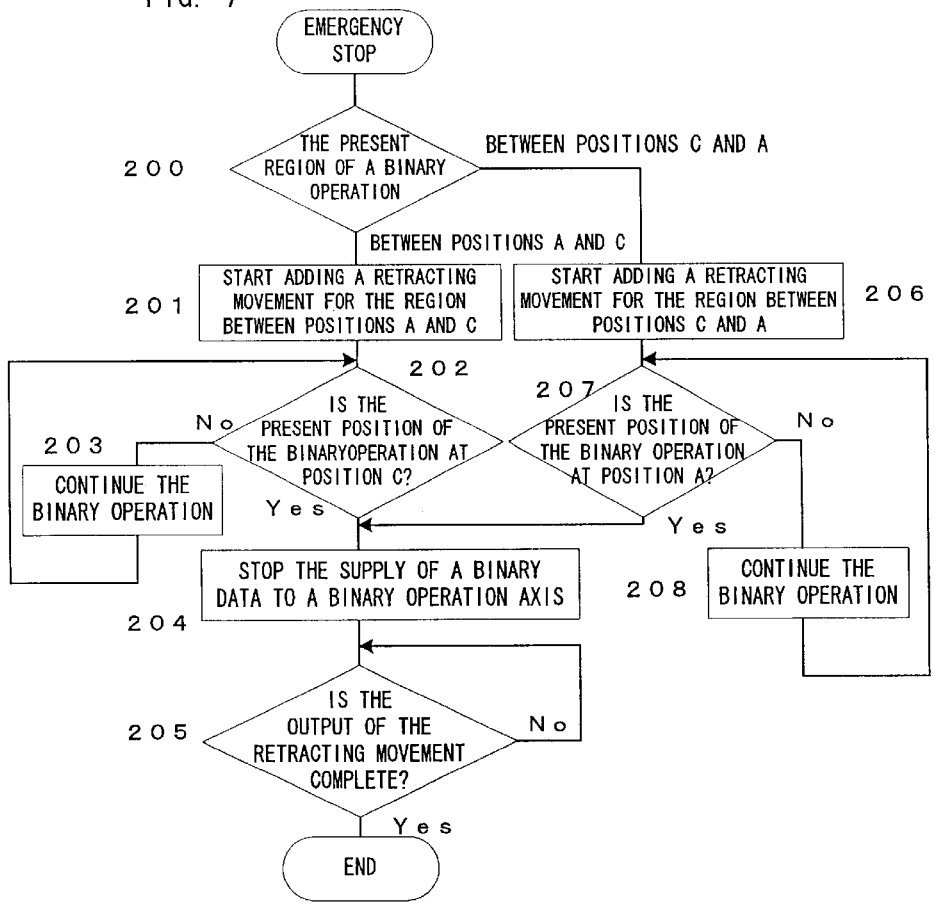
FIG. 7 is a process flow chart of a retracting motion in the second preferred embodiment in accordance with the present invention.

FIG. 7 shows an example in which a plurality of stop positions are provided within one cycle of the binary operation and is a flow chart of an emergency stop motion processing in which the binary operation is stopped at positions A and C in the example shown in FIG. 1. In this case, set are the retracting movements to the retracting positions in the absolute coordinate system where the tool does not interfere with a workpiece and any obstacles when the tool is stopped at positions A and C. Also, the speed of retracting motion is set. Further, in the case where the retracting motion is stored as the movement for each period in correspondence with the period for the binary motion, it is necessary to store the movement in correspondence with the stop positions A and C.

When an emergency stop signal is entered during the binary operation by occurrence of an abnormality or by the external signal such as an emergency stop command or the like from the operation control panel 81, the processor 11 starts the processing shown in FIG. 7. First, the processor 11 makes a judgment as to whether the present coordinate position in the binary operation is in the region between positions A and C or between positions C and A (step 200). This judgment as to whether the present coordinate position of the binary operation is in the region between positions A and C or between positions C and A is made by the number of periods within one operation cycle of the binary operation or by the rotational position of the rotary axis (C-axis) in the case shown in FIG. 1.

If judged that the present coordinate position of the binary operation is in the region between positions A and C, the movement for each period of the binary operation is determined from the retracting movement and the retracting speed which are set for the region between positions A and C (or is determined by the retracting movement for each period if the retracting movement is set and stored) and then a processing of adding the determined movement to the movement of each axis (X axis in the case of FIG. 1) for each period in the binary operation is started (step 201). Then, the processor 11 makes a judgment as to whether the present position of the binary operation reaches position C or not (or whether or not the output of a movement command of one cycle is completed up to the period where a movement to position C has just been outputted) (step 202). If the present position of the binary operation does not reach position C, the retracting movement is added to the binary data and the resultant movement is outputted to the axis control circuit (step 203). In the case of FIG. 1, the resultant movement is outputted to the axis control circuit 30 for the X axis which is a retracting axis. This operation is repeated (steps 202, 203).

When the binary data up to position C is put out, the supply of the binary date to the binary operation axis is stopped (step 204) and a judgment as to whether the output of the retracting movement is completed or not is made (step 205). If the output of the retracting movement is completed, the processing is finished, but, if not, the retracting movement is outputted to the axis control circuit 30 until the output of the retracting movement is completed, thereby finishing this emergency stop motion. As a result, the X axis which is a retracting axis is retracted to the predetermined position set in the absolute coordinate system so that the tool 3 retracts to a position where it interferes with neither the workpiece 2 nor the obstacle 5.

If it is found that the present position is in the region between positions C and A in the step 200, the processor 11 starts a processing of adding the retracting movement to the movement for each period of the binary operation to output the resultant movement to the axis control circuit (step 206). Then, this operation is repeated until the X axis reaches position A (steps 207, 208). If the X axis reaches position A, the process proceeds to a step 204 and executes the above mentioned processing.

What is claimed is:

1. A numerical control device to synchronously control a movement of a plurality of axes of a machine, with respect to each other, to repeatedly control a cyclic motion by storing a movement of each axis of the plurality of axes for respective predetermined periods in a memory unit and by supplying the movement stored in the memory unit to each axis of the plurality of axes every predetermined period, comprising:

a retracting unit to provide an amount of retraction to a specified axis, as a retracting axis, from among the plurality of axes, such that the retraction is added to a synchronous control of the retracting axis to stop the supply of the movement stored in the memory unit, upon an occurrence of an emergency stop due to an external signal or alarm, wherein the retracting unit stops the supply of the movement at a predetermined point of the cyclic motion.

2. The numerical control device according to claim 1, wherein the amount of retraction is previously set in the retracting unit.

3. The numerical control device according to claim 1 wherein the retracting unit adds the amount of retraction to the movement for the cyclic motion of the retracting axis extending over a predetermined number of periods, in the event of the emergency stop.

4. The numerical control device according to claim 1, wherein the predetermined point, where the retracting unit stops the supply of the movement, is determined based on a rotational position of another axis of the plurality of axes with the retracting axis.

5. A numerical control device to synchronously control a movement of a plurality of axes of a machine, with respect to each other, to repeatedly control a cyclic motion by storing a movement of each axis of the plurality of axes for respective predetermined period in a memory unit and by supplying the movement stored in the memory unit to each axis of the plurality of axes every predetermined period, comprising:

a retracting unit to determine a motion region of a cyclic motion, of one of the plurality of axes, upon an occurrence of an external signal or alarm, to move a specified axis of the plurality of axes, as a retracting axis, in a specified direction by set amount of retraction and to stop the supply of the movement stored in the memory unit, upon the occurrence of an emergency stop due to an external signal or alarm, wherein the retracting unit stops the supply, to the retracting axis, of the movement at a predetermined point of the cyclic motion corresponding to the determined motion region.

6. The numerical control device according to claim 5, wherein the retracting unit is set for each motion region.

7. The numerical control device according to claim 5 wherein the retracting unit adds the amount of retraction to the movement for the cyclic motion of the retracting axis extending over a predetermined number of periods, in the event of the emergency stop.

8. The numerical control device according to claim 5, wherein the predetermined point, where the retracting unit stops the supply of the movement, is determined based on a rotational position of another axes of the plurality of axes with the retracting axis.

* * * * *